(12) United States Patent
Gilbergs et al.

(10) Patent No.: US 11,709,233 B2
(45) Date of Patent: Jul. 25, 2023

(54) LIDAR DEVICE

(71) Applicant: Robert Bosch GmbH, Stuttgart (DE)

(72) Inventors: Holger Maris Gilbergs, Sersheim (DE); Johannes Richter, Ludwigsburg (DE); Karl Christoph Goedel, Vaihingen an der Enz (DE); Simon Bell, Sersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 456 days.

(21) Appl. No.: 16/881,974

(22) Filed: May 22, 2020

(65) Prior Publication Data

US 2020/0386866 A1 Dec. 10, 2020

(30) Foreign Application Priority Data

Jun. 6, 2019 (DE) .......................... 102019208269.6

(51) Int. Cl.
*G01S 7/481* (2006.01)

(52) U.S. Cl.
CPC .......... *G01S 7/4817* (2013.01); *G01S 7/4814* (2013.01)

(58) Field of Classification Search
CPC ..... G01S 7/4817; G01S 7/4814; G01S 7/4815
See application file for complete search history.

(56) References Cited

U.S. PATENT DOCUMENTS

| | | | |
|---|---|---|---|
| 2019/0094345 A1* | 3/2019 | Singer | G01S 17/42 |
| 2020/0088859 A1* | 3/2020 | Shepard | G01S 7/4865 |
| 2020/0096634 A1* | 3/2020 | Droz | G01S 7/4818 |
| 2020/0284883 A1* | 9/2020 | Ferreira | G01S 17/10 |
| 2021/0181348 A1* | 6/2021 | Zhang | G01S 7/4814 |

* cited by examiner

*Primary Examiner* — Jennifer Doan
(74) *Attorney, Agent, or Firm* — Norton Rose Fulbright US LLP; Gerard Messina

(57) ABSTRACT

A LIDAR device, including a housing, and an emitter device that is situated rotatably about a rotation axis and that is designed in such a way that the measuring beams of the emitter device intersect in the area of an exit aperture of the LIDAR device.

10 Claims, 4 Drawing Sheets

Conventional
Fig. 2
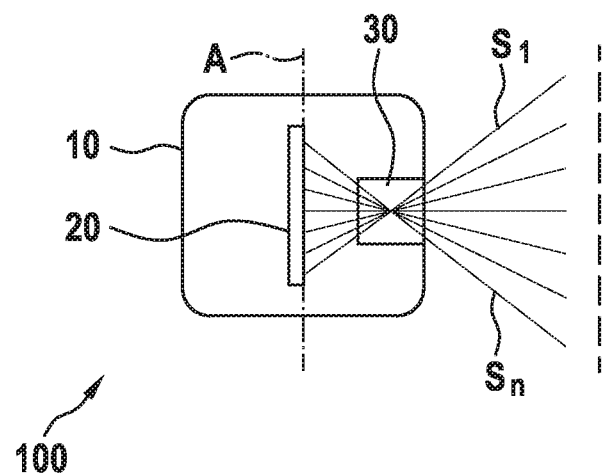

LIDAR DEVICE

CROSS REFERENCE

The present application claims the benefit under 35 U.S.C. § 119 of German Patent Application No. DE 102019208269.6 filed on Jun. 6, 2019, which is expressly incorporated herein by reference in its entirety.

FIELD

The present invention relates to a LIDAR device. The present invention further relates to a method for manufacturing a LIDAR device.

BACKGROUND INFORMATION

LIDAR sensors will become established in the next few years when highly automated driving functions on highways and in urban surroundings are implemented. One essential property of these sensors is that the expected performance may only be achieved if the optical exit window to the surroundings is essentially free of contaminants and/or obstructions.

Optoelectronic 3D scanners are available in various variants. These are to be understood as rotating macroscanners, MEMS-based scanners, OPA (optical phase array) LIDAR, Flash LIDAR. All of the aforementioned systems have in common that they collect emitted laser light. There are optical systems that include one or multiple lens(es). They all have in common that they have a long optical reception path or a large number of lenses.

LIDAR sensors having a rotating emitting and receiving path emit one or multiple light beams into the space to be observed. Here, a fanned out bundle of light is "panned over the space." This bundle of light is divergently emitted into the space by the transmitting unit and thus requires an exit window that is greater than a surface covered by the emitters.

SUMMARY

It is an object of the present invention to provide an improved LIDAR device.

According to a first aspect, the present invention provides a LIDAR device. In one example embodiment according to the present invention, the LIDAR device includes:
 a housing; and
 an emitter device that is situated rotatably about a rotation axis and that is designed in such a way that the measuring beams of the emitter device intersect in the area of an exit aperture of the LIDAR device.

Advantageously, an exit aperture or an exit window or an exit lens may thus be minimally designed with regard to a geometric height, whereby the effort to conceal the LIDAR device in the motor vehicle may be advantageously minimized. The LIDAR device may thus be advantageously more easily installed at different locations in the vehicle. Furthermore, effort for providing the exit aperture may be advantageously minimized.

According to a second aspect of the present invention, the object may be achieved with the aid of a method for manufacturing a LIDAR device. In accordance with an example embodiment of the present invention, the method includes the steps:

providing a housing; and
 providing an emitter device that is situated rotatably about a rotation axis and that is designed in such a way that the measuring beams of the emitter device intersect in the area of an exit aperture of the LIDAR device.

Preferred specific embodiments of the LIDAR device in accordance with the present invention are described herein.

In accordance with one advantageous refinement of the LIDAR device according to the present invention, the geometric directions of the measuring beams are adjustable through defined geometric orientations of the emitter elements of the emitter device. In this way, the differently oriented measuring beams are provided in that the emitter elements are installed at a suitable angle.

In accordance with a further advantageous refinement of the LIDAR device according to the present invention, the geometric directions of the measuring beams are adjustable with the aid of optical beam forming elements upstream from the emitter device. An alternative form of the direction adjustment of the measuring beams of the emitter device is provided in this way.

In accordance with a further advantageous refinement of the LIDAR device according to the present invention, the optical beam forming elements are designed as lenses or optical diffraction gratings. Different optical beam forming elements are thus advantageously provided.

In accordance with a further advantageous refinement of the LIDAR device according to the present invention, the emitter device is designed as a vertical flash LIDAR. Advantageously, the emitter device may thus be designed without optical beam forming elements.

In accordance with a further advantageous refinement of the LIDAR device according to the present invention, the measuring beams of the emitter device form a caustic. In this way, different angle resolutions are advantageously implementable for the LIDAR device in different space areas, for example a rather high resolution may be implemented in the center and a rather low resolution may be implemented on the top and on the bottom. Extremely high power densities in one point may be advantageously avoided in this way.

In accordance with a further advantageous specific embodiment of the LIDAR device according to the present invention, the intersection of the measuring beams is inside or outside of the housing. In this way, different technical approaches are provided for the beam forming of the measuring beams of the emitter device.

In accordance with a further advantageous specific embodiment of the LIDAR device according to the present invention, the measuring beams are emittable horizontally in different directions with the aid of the emitter device. In this way, eye safety of the LIDAR device may be advantageously enhanced, since in the horizontal direction, the measuring beams are emitted in different directions. An excessively high power density in individual points may thus be largely advantageously prevented.

In accordance with a further advantageous refinement of the LIDAR device according to the present invention, in the case of objects defined to be close to the LIDAR device, the emitter device may be turned off. For example, this is implementable in such a way that a detector detects very close objects and subsequently turns off the LIDAR device for safety reasons. In a simple manner, a safety shutdown is thus provided for the LIDAR device.

In accordance with a further advantageous refinement of the LIDAR device according to the present invention, a minimum height of the exit aperture is defined by a receive path of the LIDAR device. A minimal geometric height of the exit aperture is also determined by the reception architecture. The latter also considerably depends on the type of the LIDAR sensor, for example whether optics are situated upstream from it, etc. As a result, the height of the exit aperture may not be designed to be arbitrarily small in this way, but it also considerably depends on the technical implementation of the reception architecture of the LIDAR device.

Further features and advantages of the present invention are described below in detail based on multiple figures. Elements which are identical or have identical functions have identical reference numerals. The figures are used in particular to illustrate the principles which are essential to the present invention and are not necessarily implemented true to scale.

Disclosed features of the device similarly result from corresponding disclosed features of the method and vice versa. This means in particular that features, technical advantages, and embodiments related to the LIDAR device similarly result from corresponding embodiments, features, and advantages of the method for manufacturing a LIDAR device and vice versa.

BRIEF DESCRIPTION OF THE DRAWINGS

FIGS. 2 through 6 show views of specific embodiments of a LIDAR device in accordance with the present invention.

DETAILED DESCRIPTION OF EXAMPLE EMBODIMENTS

One feature of the present invention is in particular to provide an example, improved LIDAR device, in particular in terms of a geometry aspect.

Figure 1:
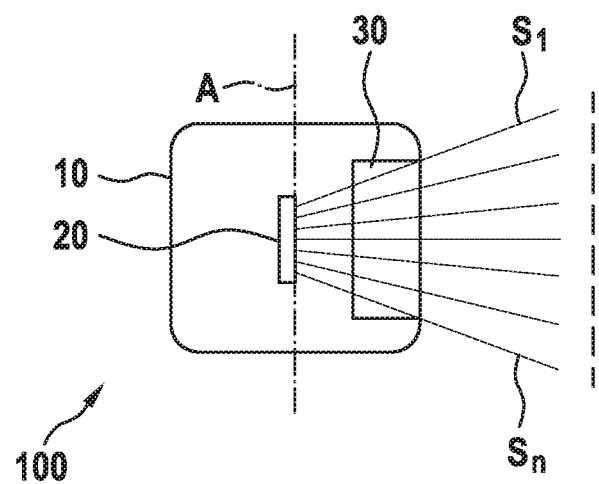
FIG. 1 shows a cross sectional view of a conventional LIDAR device.

FIG. 1 shows a cross sectional view of a conventional LIDAR device 100. A housing 10 is apparent, in which an emitter device 20, which emits measuring beams $S_1 \ldots S_n$ through an exit aperture 30 or an exit window outwardly into the surroundings, is situated rotatably about a rotation axis A. In this way, a rotatable or rotating LIDAR device 100 (also referred to as spinning LIDAR) is designed whose transceiver device is rotatably situated about rotation axis A. These types of rotating LIDAR sensors in general have a divergent distribution of the measuring radiation, thus requiring a relatively large exit aperture 30. For exit aperture 30, a synthetic plastic, for example in the form of polycarbonate (PC) or polymethyl methacrylate (PMMA, "acrylic glass," "plexiglass"), is usually used as the optical element, since this material is more easily manufacturable than glass material.

It is provided to equip LIDAR device 100 with a convergent beam path of measuring beams $S_1 \ldots S_n$ by designing the beam path in a targeted manner, individual measuring beams $S_1 \ldots S_n$ intersecting in a cross sectional view. The closer the narrowest point of the measuring radiation distribution is to exit aperture 30, the smaller or the less high the latter may be designed. Under certain circumstances, the height of exit aperture 30 may thus be advantageously smaller than the height of emitter device 20 on the rotor (not illustrated), as is apparent in the cross sectional view of a provided LIDAR device 100 in FIG. 2. Measuring beams $S_1 \ldots S_n$ may intersect directly in one focal point or a beam waist, similar to a caustic.

In the cross sectional view of LIDAR device 100 of FIG. 2, it is apparent that measuring beams $S_1 \ldots S_n$ intersect in one focal point within exit aperture 30. The height of the window opening of exit aperture 30 may be advantageously smaller than in the case of a conventional LIDAR device 100 of FIG. 1, while having the same opening angle.

Figure 3:
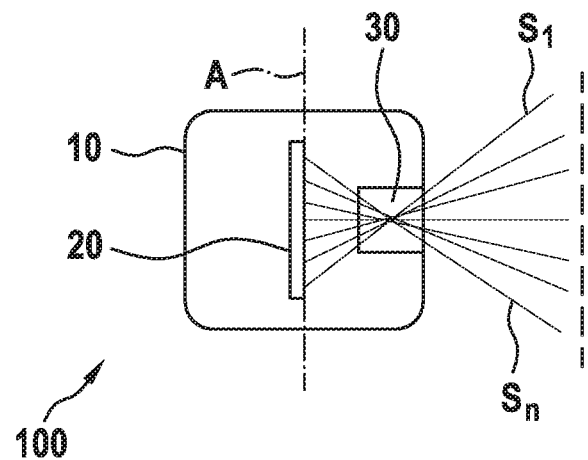

In the cross sectional view of the specific embodiment of LIDAR device 100 of FIG. 3, it is apparent that measuring beams $S_1 \ldots S_n$ do not necessarily have to intersect in a single, shared focal point. In this case, a course of measuring beams $S_1 \ldots S_n$ is formed similarly to a caustic, a radiance being varied via a "fan" of measuring beams $S_1 \ldots S_n$ through this course of measuring beams $S_1 \ldots S_n$.

Figure 4:
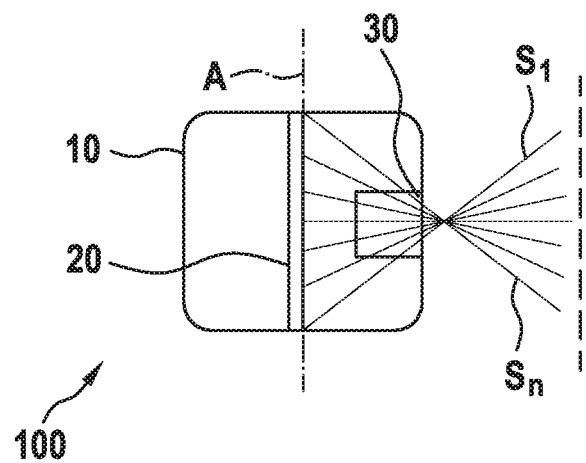

In the cross sectional view of the specific embodiment of LIDAR device 100 of FIG. 4, it is apparent that the beam waist or the intersection of measuring beams $S_1 \ldots S_n$ may lie not only within exit aperture 30, as is the case in FIGS. 2 and 3, but also outside of exit aperture 30 or outside of housing 10. A caustic beam course of measuring beams $S_1 \ldots S_n$, which is advantageous in the sense of eye safety of a person present in front of LIDAR device 100, is also possible in this case similar to the arrangement of FIG. 3. This may be in particular attributed to the fact that measuring beams $S_1 \ldots S_n$ are less intense per area or space unit in the beam waist.

Under certain circumstances, the bundling of measuring beams $S_1 \ldots S_n$ in a narrow space may have a negative effect on the eye safety or on the maximally admissible transmitting power of emitter device 20 of LIDAR device 100 or of the LIDAR sensor equipped therewith. To avoid or at least mitigate this disadvantage, multiple different possibilities may be provided:

It may be provided for this purpose for example that emitter device 20 may be automatically switched off, if objects or persons that are located very closely to LIDAR device 100 are detected by LIDAR device 100. This may be achieved by detecting and evaluating sensor data of LIDAR device 100 or optionally by using an additional proximity sensor (not illustrated) at LIDAR device 100 or at the vehicle.

Figure 5:
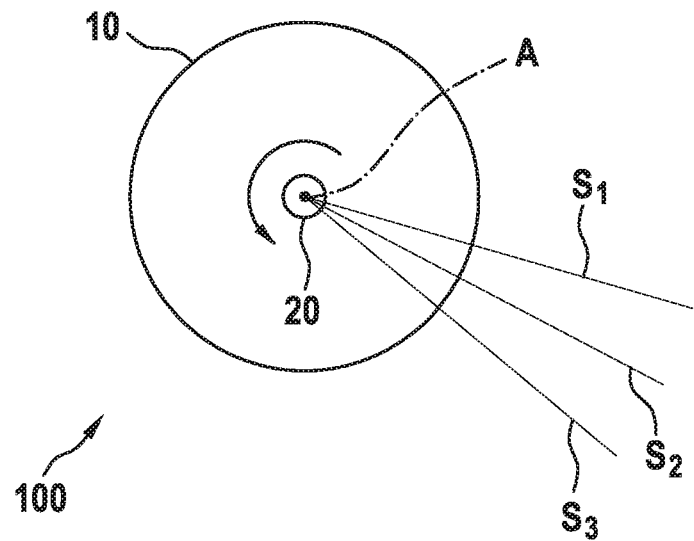
Figure 6:
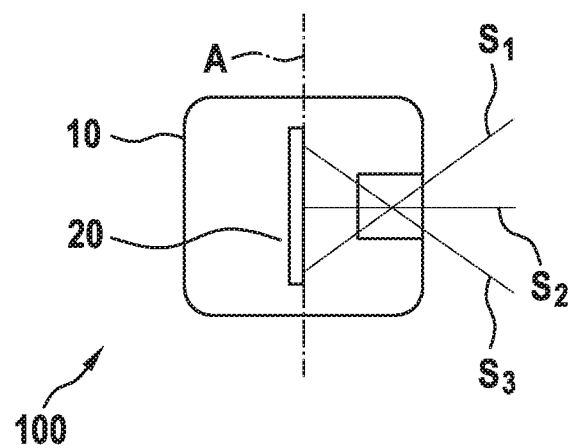

Furthermore, measuring beams $S_1 \ldots S_n$ may also be fanned out to achieve an eye-safe measuring radiation distribution about rotation axis A, which is apparent in the top view of LIDAR device 100 of FIG. 5. It is provided in this case that the three exemplary measuring beams $S_1$, $S_2$ and $S_3$ are offset in each case in the top view at a defined angle with regard to one another, which does not pose a disadvantage for a cross sectional distribution of measuring beams $S_1$, $S_2$, $S_3$ of LIDAR device 100 illustrated in FIG. 6. Measuring beams $S_1 \ldots S_n$ are in this case only "fanned out" about rotation axis A of LIDAR device 100.

Emitter device 20 may for example include multiple emitter elements (for example in the form of laser diodes, not illustrated), each being suitably oriented for achieving the provided radiation direction. The directional characteristic of measuring beams $S_1 \ldots S_n$ may alternatively also be achieved with the aid of optical beam forming elements (not illustrated), which are for example designed in the form of an optical diffraction grating, a lens, etc.

Provided LIDAR device 100 may thus be used for sensors having individual measuring impulses per measuring point and for a LIDAR device 100 having a strip-type measuring radiation distribution that is achieved with the aid of a vertical flash LIDAR. A suitably oriented "measuring radiation plane" may be emitted with the aid of the vertical flash LIDAR.

A minimal size of the window of exit aperture 30 may be defined by a detection or receive path (not illustrated) of LIDAR device 100, since a smaller exit aperture 30 may have a negative effect on the signal/noise ratio of the received signal. In this case, the optimal window size of exit aperture 30 must be determined or the detector must be adapted to the given opening of exit aperture 30 as part of the design.

It is understood that in all variants of LIDAR device 100 described above, measuring beams $S_1 \ldots S_n$ are illustrated or selected only by way of example and that a considerably greater amount of measuring beams $S_1 \ldots S_n$ than illustrated in the figures may be emitted by emitter device 20.

Provided LIDAR device 100 in accordance with the present invention may be advantageously used for detecting the surroundings in highly and fully automated vehicles (levels 3 to 5).

Figure 7:
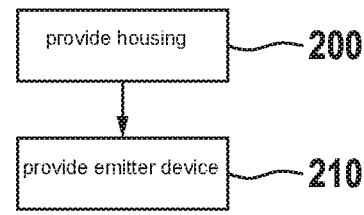
FIG. 7 shows a flow chart of an example method for manufacturing a provided LIDAR device in accordance with the present invention.

FIG. 7 shows a sequence in principle of one specific embodiment of the provided method for manufacturing a LIDAR device 100.

In a step 200, a provision of a housing 10 is carried out.

In a step 210, a provision of an emitter device 20 takes place that is situated rotatably about a rotation axis A and that is designed in such a way that measuring beams $S_1 \ldots S_n$ of emitter device 20 intersect in the area of an exit aperture 30 of LIDAR device 100.

The sequence of steps 200 and 210 may be advantageously interchanged.

Advantageously, an integration into a vehicle may be implemented considerably more easily in the case of the provided LIDAR device, since the exit aperture to be concealed (for example in the radiator grill) may be considerably smaller than in the case of conventional LIDAR devices, so that the LIDAR device is thus not visible from the outside.

Although the present invention was elucidated in the context of an optoelectronic 3D scanner in the form of a LIDAR sensor for a motor vehicle, it is also possible, for example, to provide the example LIDAR device 100 in accordance with the present invention for other utilizations, for example to design it as an application for monitoring buildings, etc.

Those skilled in the art thus recognizes that a plurality of modifications is possible, without departing from the core of the present invention.

What is claimed is:

1. A LIDAR device, comprising:
   a housing; and
   an emitter device, which is situated rotatably about a rotation axis and which is configured so that a beam waist or intersection of measuring beams of the emitter device occurs in one focal point in an area of an exit aperture of the LIDAR device;
   wherein the measuring beams are fanned out to achieve an eye-safe measuring radiation distribution about a rotation axis of the emitter device, and
   wherein the emitter device is configured to be turned off for objects defined as being within a particular distance to the LIDAR device.

2. The LIDAR device as recited in claim 1, wherein geometric directions of the measuring beams are adjustable through defined geometric orientations of emitter elements of the emitter device.

3. The LIDAR device as recited in claim 1, wherein geometric directions of the measuring beams are adjustable using optical beam forming elements upstream from the emitter device.

4. The LIDAR device as recited in claim 3, wherein the optical beam forming elements includes lenses or optical diffraction gratings.

5. The LIDAR device as recited in claim 1, wherein the emitter device includes a vertical flash LIDAR.

6. The LIDAR device as recited in claim 1, wherein the measuring beams of the emitter device form a caustic beam course.

7. The LIDAR device as recited in claim 1, wherein the intersection of the measuring beams is inside or outside of the housing.

8. The LIDAR device as recited in claim 1, wherein the measuring beams are emittable horizontally in different directions using the emitter device.

9. The LIDAR device as recited in claim 1, wherein a minimal height of the exit aperture is defined by a receive path of the LIDAR device.

10. A method for manufacturing a LIDAR device, the method comprising:
    providing a housing; and
    providing an emitter device, which is situated rotatably about a rotation axis and which is configured so that that a beam waist or intersection of measuring beams of the emitter device occurs in one focal point in an area of an exit aperture of the LIDAR device;
    wherein the measuring beams are fanned out to achieve an eye-safe measuring radiation distribution about a rotation axis of the emitter device, and
    wherein the emitter device is configured to be turned off for objects defined as being within a particular distance to the LIDAR device.

* * * * *